United States Patent Office 3,153,211
Patented Oct. 13, 1964

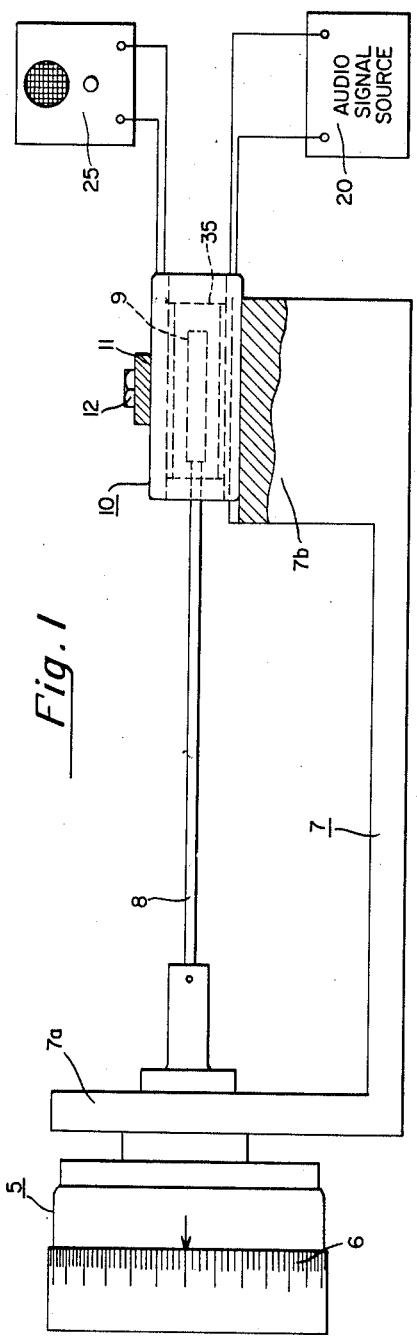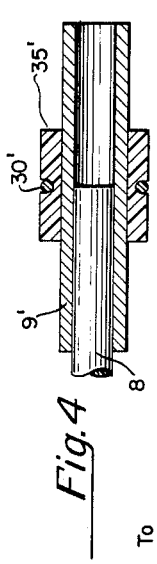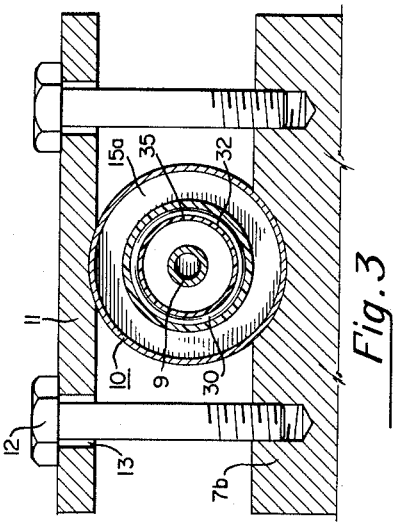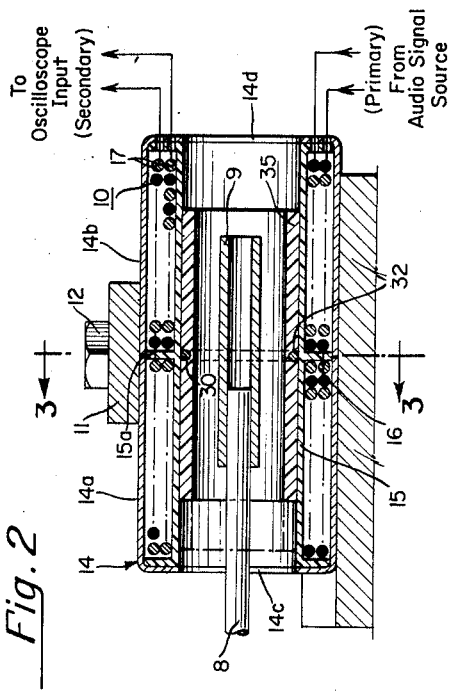
Oct. 13, 1964  G. K. HOUPT ET AL  3,153,211
SHORTED RING NULL BALANCING FOR DIFFERENTIAL TRANSFORMERS
Filed March 23, 1962
INVENTORS.
JACK W. EWING
GROVER K. HOUPT
BY
Nelson E. Kimmelman
ATTORNEY

3,153,211
SHORTED RING NULL BALANCING FOR DIFFERENTIAL TRANSFORMERS
Grover K. Houpt, Lansdale, and Jack W. Ewing, Malvern, Pa., assignors to Automatic Timing & Controls, Inc., King of Prussia, Pa., a corporation of Pennsylvania
Filed Mar. 23, 1962, Ser. No. 181,979
8 Claims. (Cl. 336—136)

This invention relates to transformers and, in particular, to methods and apparatus for eliminating the residual "null signal" voltage produced within a differential transformer.

Differential transformers are well known in the electrical art and have achieved wide usage because of their sensitivity, their resolution capabilities, and their relatively high output. Differential transformers consist, in general, of one or more primary windings wound around a bobbin and a number of secondary windings wound around or in proximity to the primary winding. Often, the secondary windings are connected in series-bucking relation. The primary winding is energized by a source of an alternating current. A generally cylindrical armature is positioned and arranged for axial movement along the longitudinal axis of the bobbin. It is arranged to be displaced axially in response to pressure or other condition to be sensed which thereby varies the inductive coupling from the primary to the secondary windings. Since the secondary windings are connected series-bucking, there will be a certain position of the armature at a point near the mid-point of the transformer called the "null point" at which the opposite and approximately equal voltages produced by the bucking secondary windings ideally should cancel one another to produce a zero output voltage known as the "null voltage" which predominantly consists of a fundamental component having the same frequency as the voltage used to energize the primary winding. The amplitude of the voltage induced in the secondary windings is determined by the amount of longitudinal displacement of the armature, whereas the polarity of the induced voltage depends upon the direction of displacement of the armature away from the "null point."

In practice, however, it is almost impossible to produce a zero null voltage for a number of reasons which include unbalances or asymmetries in the windings, unbalance or asymmetries in the surfaces or other parts of the armature, mechanical asymmetries resulting from the tolerances of the mechanical parts involved or from the procedures employed in assembling them, capacitive unbalances due to non-uniform physical placement of the windings or other aberrations thereof, etc. Also, in practice, the voltages induced in the secondary windings will contain distortion in the form of different amplitudes and phase relations of harmonics induced in the secondary windings. It is primarily with the elimination of the fundamental frequency component of the null voltage, however, that this invention is concerned.

Improvements in the direction of reducing the fundamental component of the null voltage are of great importance in highly sensitive servosystems which employ differential transformers, especially in those in which more than one differential transformer is used.

Previous methods of minimizing the fundamental component of the null voltage included methods whereby external means were provided for producing a voltage in series with the output of the differential transformer which had an amplitude and polarity that cancelled the null voltage. A similar way was to load one or the other half of the secondary windings (as by putting a resistor or capacitor across one of the two secondary windings, for example) in order to produce a current having the desired amplitude and phase so as to produce a cancelling resultant voltage drop. Still another method was to apply an exciting voltage to the primary winding and manually adjust or shift the turns of the secondary until the smallest null voltage was measured across them. If it was desired to moisture-proof the windings as by potting them with a plastic, the adjustment of the secondary turns had to be done before the potting. Sometimes, after experimenting with various positional changes in the secondary windings in order to achieve the lowest null voltage, the adjuster would believe that the best arrangement of the windings for minimum null voltage had been attained and would then approve the transformer for potting. However, when the potting material was applied it often disrupted the best arrangement of the secondary windings with the result that the null voltage achieved was not the desired lowest possible null voltage. Where the transformer was ultimately to be encased in a magnetic shield, the adjustment of the secondary windings had to be done with the shield off, but when the shield was put on again, the interaction of the new arrangement of the winding with the new shield position effectively changed the best null-position.

The objects of the present are, therefore, to provide, inter alia:

(1) An improved magnetic device characterized by a substantially negligible fundamental component of null-voltage.

(2) An improved differential transformer with substantially no fundamental component of null voltage.

(3) A simple and effective procedure for producing a magnetic device having a substantially negligible fundamental component of null-voltage.

(4) A simple and effective method for producing a substantially negligible fundamental component of null-voltage in a differential transformer.

(5) A fast, simple and economical procedure for mass-producing differential transformers having substantially negligible fundamental components of null-voltages.

Other objects of the invention may be appreciated from perusing the specification, claims and drawings herein. In accordance with our invention we obtain practically complete suppression of the fundamental component of the null-voltage in magnetic devices (such as differential transformers and the like) by interposing between the armature and the windings of the magnetic device a selected number of turns which provide a short circuit path for currents induced therein. In one form of the invention, one or more closed rings of conductive material are mounted on a cylindrical body made of non-magnetic material which is slid into a tight fitting engagement with the bore of the differential transformer bobbin. The exact final position of the adjustment ring(s) is determined by a process which involves (1) positioning the armature without the adjusting ring at a point where the minimum fundamental null-voltage is initially obtained, (2) introducing the adjustment ring to reduce the fundamental component of the null-voltage even more, (3) repositioning the armature to reduce the previous null-voltage reading finally and (4) moving the adjustment ring again to lower the next previous reading.

FIGURE 1 is a side elevation, partly sectional and schematic view of apparatus and a system for producing the improved differential transformer according to our invention.

FIGURE 2 is an enlarged side-elevation sectional view of one part of the system shown in FIG. 1.

FIGURE 3 is a sectional view of the differential transformer and its mounting means taken along the section line 3—3 in the direction indicated by the arrows.

FIGURE 4 is a fragmentary sectional view of our invention in another form.

Referring to FIG. 1, a test set-up for producing the improved differential transformer according to our invention is shown. A micrometer indicated generally at the numeral 5 is depicted as having appropriate indexing graduations on the revolvable part 6 thereof. It is positioned in a supporting frame 7 having an upright section 7a through which the micrometer extends. A narrow shaft 8 made of wood or other non-magnetic material is inserted fixedly into the collet 4 of micrometer 5 and a cylindrical armature 9 made of a magnetic material is slipped over the end of the shaft 8. A differential transformer indicated generally at the numeral 10 is held in fixed relation to the right hand mounting block 7b by a rectangular member 11. Member 11 is releasably secured by bolts 12 which pass through apertures 13 and are screwed into threaded apertures in the latter.

The differential transformer 10 comprises, in a typical example, a shielding shell 14 having two parts 14a and 14b each having coaxial apertures 14c and 14d respective end portions. The shell 14 surrounds the bobbin 15 which is divided into two parts by an annular part 15a. Wound around the bobbin are primary windings 16 and secondary windings 17.

As shown in FIG. 2, the primary and secondary windings may be laid down in a bi-filar relation as described in U.S. Patent 2,568,587, although this form of differential transformer is merely exemplary of one type with which the invention may be used.

In a typical case, the secondary windings may be wound in series-bucking relation so as to produce oppositely polarized magnetic fields when currents are induced therein. It should be remembered, however, that to produce a null-voltage the secondary windings need not be wound in series-bucking relation, but can be wound in series-aiding relation. In the latter case, two equal resistances in series may be shunted across the ends of the secondary windings to form a bridge, and from the junction of these resistors and the junction of the two secondary windings a null-voltage can be obtained when the armature is near the physical midpoint of transformer. Reference is made to U.S. Patent 2,801,874 issued to W. Macgeorge on August 6, 1957. The primary windings 16 are coupled to the output terminals of an audio signal source 20 which may be in the frequency range of 60 cycles to 2000 cycles per second, for example, although other suitable frequencies may also be employed. The secondary windings 17 are coupled to the input of a measuring and/or indicating device such as the vertical deflection circuit of an oscilloscope 25, for example, or to a vacuum tube voltmeter. As the portion 6 of the micrometer 5 is revolved, the armature 9 will be subjected to axial movement along the longitudinal axis of the differential transformer 10.

In accordance with our invention, there is interposed between the windings of the differential transformer and the armature 9 a selected number of turns of a conductor. In the illustrated embodiment of our invention there is a null-adjusting shorted turn 30 made of wire or other conductor which is lodged within a peripheral groove 32 formed in a plastic or other non-magnetic mounting cylinder 35. The groove 32 has sufficient depth to enable the cylinder 35 to be moved axially in close contact with the surface of the bore of the bobbin 15. The null adjustment ring 30, in response to the energization of the primary winding 16 by the source 20 sets up a magnetic field which is sufficient to induce in the secondary windings a voltage which cancels out the fundamental component of the null-adjust voltage.

In practice, the section 6 of the micrometer is first revolved until the armature 9 is positioned at a point which produces a minimal composite null-voltage (fundamental and harmonics) on the viewing screen of the oscilloscope 25. Next, the adjustment cylinder 35 is moved in a direction which decreases the null-voltage even more. This adjustment may be made by using one or more sections of tubing which have the same overall diameter as the cylinder 35 and which are inserted into the bore into contact with the cylinder 35 on either side thereof. If the fit of the cylinder 35 into the bore of the bobbin 15 is very tight when it is inserted into the bore from either the left or right end thereof, it will remain in position. If desired, the outer surface of the cylinder 35 may be coated with a lubricating and sealing substance such as an epoxy resin which will harden once the best position of the null adjusting ring has been ascertained.

After the cylinder 35 has been moved to its first null-voltage reducing position, the portion 6 of micrometer 5 is revolved again until the null-voltage shown on the oscilloscope 25 is again reduced. Finally the adjustment cylinder 35 is once more repositioned until the fundamental component of the null-voltage is not visible upon the oscilloscope screen. When this final step has been accomplished, the composite null-voltage will have been reduced from an initial reading of say, 100 millivolts, peak-to-peak, to a very minimal quantity say, 6 millivolts, which is free from any fundamental component and consists only of negligible harmonic components.

Since it is practically impossible to insure exact duplication of windings from one differential transformer to the other, and since even the maintenance of the closest tolerances during the fabrication of the armatures will not guarantee the absence of asymmetries or inhomogeneities therein, it is rather important that the particular armature which is used in the adjustment of a particular differential transformer thereafter be the armature that is always used therewith.

The invention can also be used with other transformers such as three-winding differential transformers like the one described in U.S. Patent 2,427,866 issued to W. Macgeorge. While the invention has been described in terms of one circular turn of a conductor, one turn may suffice, but it makes the null-voltage adjustment relatively less critical. A larger number of parallel rings or turns makes the adjustment more critical and also can supply a greater null-cancelling effect where needed. In this connection, it should be stated that the turns used not be circular rings, but can also be helical turns whose ends are connected together. Also, the turns need not be short-circuited, they need only be complete circuits and hence may include resistance. Actually, the effectiveness of the turns varries directly with their conductivity, so different materials may be used for more or less effect, as desired.

The invention has been described in terms of a device which abuts the bore of the bobbin. However, it is also possible to position the null-adjust ring elsewhere, as for example on the armature itself. This can be done by slipping the ring directly around the armature or by embedding it, as shown in FIGURE 4, in a groove formed in a mounting device 35' which fits over the armature. The adjustment procedure would be generally the same in this form of the invention.

The invention has been described solely in terms of its application to a conventional differential transformer. It is, however, also useful for other types of transducers such as the variable reluctance transducer produced by the Crescent Manufacturing Co., which has a single winding that is center-tapped, and which performs the functions of both a primary and a secondary winding.

Still other applications and forms of our invention will occur to those skilled in the art. Consequently, we desire our invention to be limited only by the following claims.

We claim:

1. A magnetic device comprising: a selected number of primary windings having input terminals which are adapted to be coupled to a source of alternating current and also having a selected number of secondary windings which have output terminals adapted to be coupled to a utilization circuit; an armature made of magnetic material; said armature being constructed and arranged for movement relative to said primary and secondary windings, and a current-carrying means which provides a continuous A.-C. path positioned between said armature and said primary and secondary windings, said current carrying means being located at a point which effectively minimizes in the null-voltage the fundamental component of said alternating current which appears across said output terminals.

2. A magnetic device according to claim 1 wherein said armature is positioned to move within said windings and said current-carrying means includes a selected number of turns of a conductive material.

3. A differential transformer comprising: a selected number of primary and secondary windings wound around a hollow coil form, said primary windings including input terminals adapted to be coupled to a source of alternating current, said secondary windings also including output terminals adapted to be coupled to a utilization circuit, an elongated armature made of magnetic material and adapted to be moved axially within said hollow form, and positioned in the space between said armature and said windings a selected number of completed circuit turns of a conductive material, said turns being positioned to eliminate substantially at said output terminals the fundamental component of voltage corresponding to said input alternating current.

4. A differential transformer comprising: a selected number of primary windings and a selected number of secondary windings, said primary and secondary windings being wound around a hollow coil form, said primary windings being constructed to be energized by a source of alternating current, said secondary windings adapted to be coupled to a utilization circuit, an elongated armature of magnetic material constructed and arranged for axial movement within said hollow form, and means for substantially eliminating the fundamental component of the null-voltage applied by said secondary windings to said utilization circuit when said primary windings are energized by said source, said eliminating means comprising a supporting body in abutting relation to the inner wall of said hollow core, said supporting body being made of substantially non-magnetic material and including a selected number of turns of a conductive material, said supporting body being positioned so that said conductive turns are placed for effecting maximum elimination from said null-voltage of said fundamental component appearing in said secondary windings.

5. The differential transformer according to claim 4 wherein said supporting body is fixedly connected to the inner wall of said core.

6. A differential transformer comprising: one or more primary windings and one or more secondary windings wound about a coil form, an elongated armature of magnetic material which is movable axially inside said coil form, and one or more electrical turns disposed between said armature and said windings for producing, in response to energization of said primary windings, a magnetic field which, in turn, induces in said secondary windings a voltage which substantially reduces the composite null-voltage characteristic of said transformer.

7. The invention according to claim 6 wherein said electrical turns are short-circuited.

8. A differential transformer comprising: at least one primary winding constructed to be energized by alternating current, a plurality of secondary windings, said primary and secondary windings being wound around a hollow coil form, an elongated armature of magnetic material which is movable axially within said hollow form, and means for substantially eliminating the fundamental component of the composite null-voltage of said transformer, said eliminating means comprising a tubular supporting body of substantially non-magnetic material around which a single short-circuited turn of a conductor is disposed, said body and said turn being fixedly disposed in abutting relation to the inner wall of said hollow core, said body and said turn producing, in response to energization of said primary winding, a magnetic field which induces in said secondary windings a voltage which substantially reduces the fundamental component of said composite null-voltage therein.

References Cited in the file of this patent

UNITED STATES PATENTS

| | | |
|---|---|---|
| 2,020,796 | Norris | Nov. 12, 1935 |
| 2,396,831 | Curtis | Mar. 19, 1946 |
| 2,450,868 | Berman | Oct. 12, 1948 |
| 2,507,344 | Macgeorge | May 9, 1950 |